March 24, 1931.     E. HOPKINSON ET AL     1,797,580
MANUFACTURE OF RUBBER TUBES
Filed June 23, 1925     2 Sheets-Sheet 1

Inventors
ERNEST HOPKINSON & WILLIS A. GIBBONS
By their Attorney

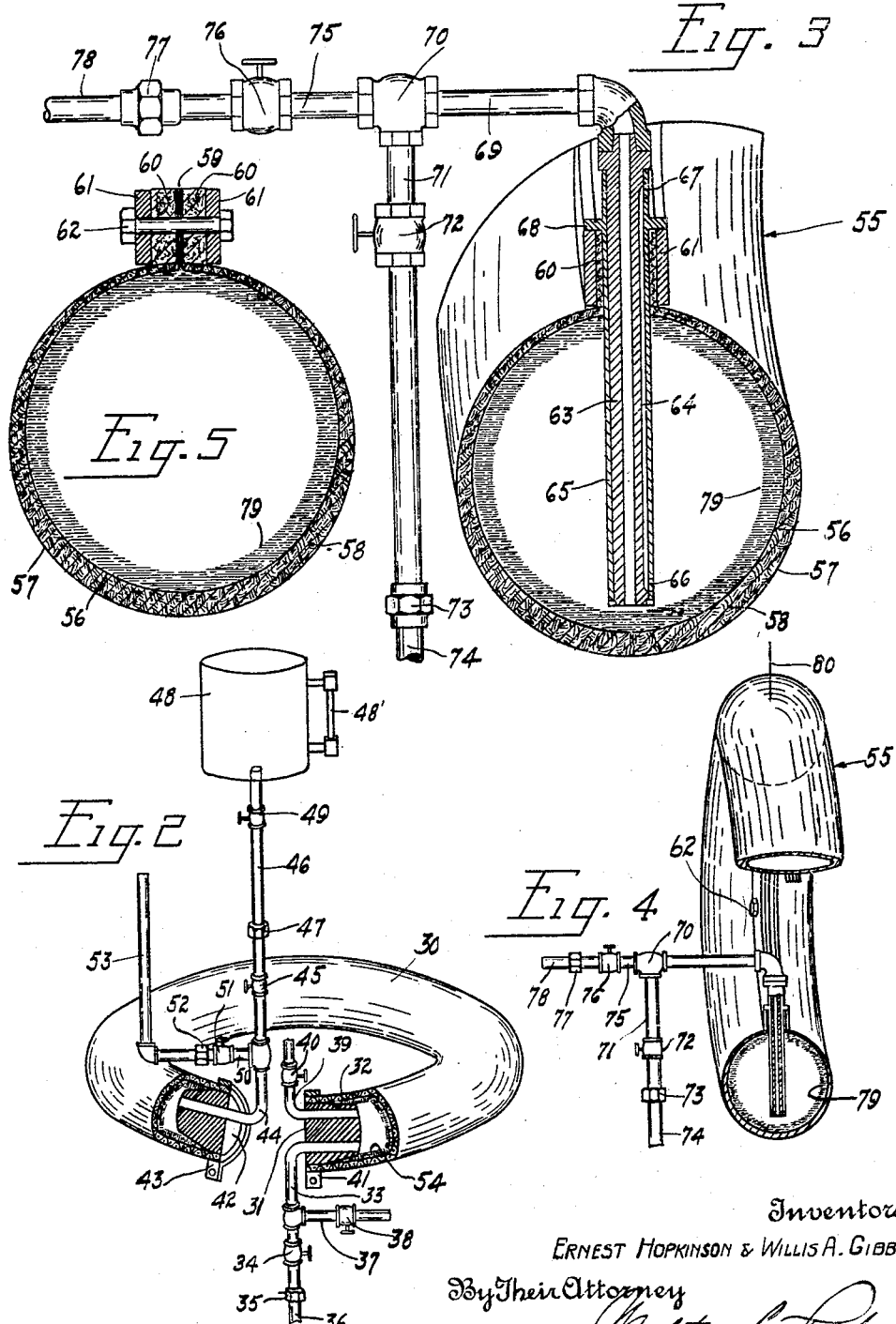

Patented Mar. 24, 1931

1,797,580

UNITED STATES PATENT OFFICE

ERNEST HOPKINSON, OF NEW YORK, AND WILLIS A. GIBBONS, OF LITTLE NECK, NEW YORK, ASSIGNORS TO MORGAN & WRIGHT, OF DETROIT, MICHIGAN, A CORPORATION OF MICHIGAN

MANUFACTURE OF RUBBER TUBES

Application filed June 23, 1925. Serial No. 38,966.

This invention relates to the manufacture of hollow rubber articles, such as tubing, and more particularly, inner tubes used with pneumatic casings in ordinary motor vehicles.

In the manufacture of inner tubes, by way of illustration, it is generally the practice to-day to roll the calendered stock around two and one-half or three and one-half convolutions about a pole or mandrel, to then tape the ends and/or the body of the tube so as to confine the stock under more or less pressure, then vulcanize the tubes, and after stripping from the pole splice the ends together. This old practice requires the use of rubber composition that has been through many and costly processes including coagulation, washing, breaking down, compounding, calendering, etc. The present invention contemplates the direct manufacture of inner tubes or hollow rubber tubing from latex or other aqueous dispersions of rubber. It aims to produce a tube with improved qualities and more cheaply than any heretofore manufactured. It aims to provide a process adaptable for manufacturing tubes in straight lengths and subsequently splicing them together, or for making them in incomplete or complete annular form. It permits the tube to be manufactured endless if desired without seam or splice. It insures the production of a tube without inherent unequal tensions likely to cause canting of the valve stem, heretofore vexatious to automobile manufacturers in their assemblage of tubes and casings. It also aims to provide a tube of more nearly uniform wall thickness than those heretofore made with cross wrappers causing inequalities in the wall thickness. It further contemplates a process permitting a tube to be formed in straight lengths or incomplete annular form with skived ends for subsequent splicing. These are some of the advantages of the invention. Others will appear in connection with the detailed description following.

With the preferred embodiments of the invention in mind, and without intention to limit its scope more than is required by the prior art, it consists essentially in providing a mold or form, with the property of permitting the passage of water and preventing the passage of rubber and leaving thereon a deposit of rubber, out of porous materials such as unglazed porous non-vitreous earthenware or fibrous materials, and depositing insoluble constitutents from a water dispersion of rubber thereon in the desired formation and of a desired wall thickness directly from the dispersion, drying the rubber or rubber compound so deposited, and ultimately completely vulcanizing the deposit. The dispersion may be a natural latex having a natural, decreased or increased rubber content, and if desired partially or completely vulcanized; or there may be used an artificial latex formed by making a dispersion of any suitable solid unvulcanized or vulcanized rubber. The latex may be, and preferably is, compounded to yield a rubber composition having suitable strength, resistance to abrasion, and other qualities requisite to satisfy the requirements of the finished product. The term "latex" is therefore employed in the claims with the above definition in mind. The latex is also preferably treated in such manner that its water content may be more readily withdrawn and its insoluble constituents will more readily deposit from the dispersion onto the desired water permeable form. After drying the deposited thickness of rubber may be stripped from the porous form or fabric which is preferably coated with starch or other adhesive preventing agent to facilitate stripping of the rubber from the mold.

For a detailed disclosure of the nature and objects of the invention reference is had to the accompanying specification and drawings illustrating apparatus for carrying out various embodiments of the invention, in which drawings, Fig. 1 is a part sectional view illustrating an apparatus suitable for making straight tubing, such as inner tubes for tires, by the use of our method;

Fig. 2 is a part sectional perspective illustrating an apparatus which may be used for making inner tubes in an incomplete annular form;

Fig. 3 is a broken sectional perspective showing an apparatus for making an inner tube in a complete annular or jointless form;

Fig. 4 is a further broken away detail view showing the manner of securing an annular form of fibrous material during use; and Fig. 5 is an enlarged cross-sectional view through the form and deposit.

Figure 1:
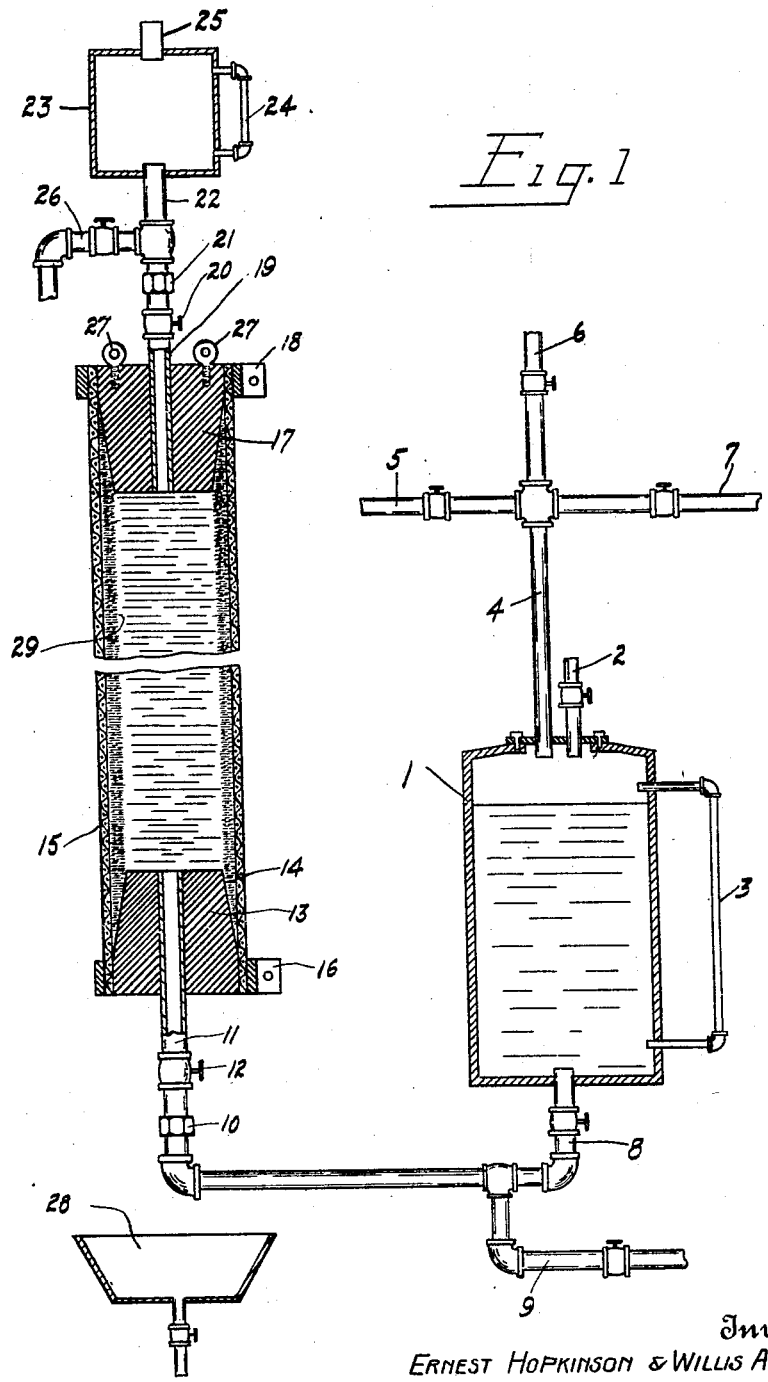

In carrying out the method for the manufacture of straight rubber tubes, for instance inner tubes for tires, the apparatus shown in Figure 1 may be used. This apparatus comprises a supply tank 1 for latex having a valve controlled filling inlet 2, and a sight glass 3 for indicating the height of the contents in the tank. A four-way connection is provided, one arm 4 of which leads into the tank, a second valve controlled arm 5 is connected to a source of air under pressure, a third valve controlled arm 6 is open to the atmosphere, and a fourth valve controlled arm 7 is connected to a suitable means for producing a vacuum in the tank. Leading from the bottom of the tank is a valve controlled pipe 8 to which is connected a valve controlled pipe 9 for supplying steam, hot air, or other desired medium. The pipe 8 is connected by a quick detachable coupling 10 to a pipe 11 provided with a valve 12, said latter pipe passing through a plug 13, one end of which plug is tapered as shown at 14. The tapered end of the plug 13 is inserted within a tubular form 15 of permeable material, the plug and tube 15 being secured together by the clamp 16. The tubular form 15 may be made of any suitable material possessing the desired permeability, and in Figure 1 is shown as being made of a woven fabric. Inserted in the other end of the tube is a plug 17 similar in all respects to the plug 13, the plug 17 being secured by a clamp 18. Extending into the plug 17 is a pipe 19 controlled by valve 20, said pipe being secured by a quick detachable coupling 21 to a pipe 22 extending into a tank 23 provided with a sight glass 24, the tank 23 being also provided with a vent 25 which may when desired be additionally used as an inlet for supplying latex. Leading from the pipe 22 above the coupling 21 is a valve controlled drain pipe 26. For convenience in handling the plug 17 may be provided with eyes 27 or any other suitable attaching means. Disposed below the tubular form 15 is a receptacle 28 for collecting serum.

In carrying out the method with the apparatus shown in Figure 1 latex is supplied to the tank 1 through the opening 2, and this latex is preferably treated in such manner as to increase its filtrability, that is to cause it to deposit at a greatly increased rate on the surface of a permeable material with which it may be in contact. Examples of the manner in which this increased filtrability may be obtained are as follows: Ordinary ammonia preserved latex is freed of its ammonia content and to the latex is then added ½% phenol and .06% trisodium phosphate. Using the above treated latex the following compound is then made up, 100 parts rubber as latex
1 part zinc oxide
2 parts precipitated sulphur
½ part oxy normal butyl thiocarbonic acid disulphide
¼ part dibenzylamine
1¾ parts glue
1½ parts solvent naphtha In mixing the above compound the various ingredients added to the latex are all incorporated in the form of emulsions. The zinc oxide and sulphur are mixed with water to make a thick mush and then added to a water solution of glue and run through a paint mixer. The oxynormal butyl thiocarbonic acid disulphide is mixed in some solvent naphtha and then emulsified with a water solution of glue to which a small amount of sodium oleate has been added. The dibenzylamine is emulsified in the same manner as the oxy normal butyl thiocarbonic acid disulphide. After mixing up the compound it is allowed to stand at room temperature for about one month. At the end of this time such a mixture is vulcanized, thickens somewhat, and its filtrability is markedly increased. For example when filtered through fabric such as underwriters hose fabric the vulcanized latex gave a deposit of .082 inches overnight. The above illustrates one method of increasing filtrability of latex by vulcanization in a specific manner.

Another example in which latex is treated to increase its filtrability is as follows: Latex is first treated to remove a large part of its water soluble constituents and the following compound then made up, 100 parts rubber as latex containing 33% solids
80 parts Gilber's whiting
20 parts mineral flour
3½ parts colloidal sulphur
1 part zinc oxide
1 part glue
½ part zinc dimethyldithiocarbamate The fillers are added in the form of a water paste and enough concentrated ammonia is added to the mix to make 1% of the ammonia. Enough water is added to make a total of 145 parts water. Such a compounded latex in two hours deposited a layer .069 inches thick. In this case the filtrability of latex is increased by the addition of fillers. The tank 1 is then placed under a vacuum for a short time by opening the valve in pipe 7 in order to withdraw air from the body of the latex. The tank is then placed in communication with the pipe 5 leading to a source of air under pressure and the latex is thereby forced through pipe 8 and 11 into the tubular form 15, the latex being supplied until it has passed up into the tank 23, when the supply is shut off. The water and any water soluble constituents then permeate the tube 15 and drip down into the receptacle 28, leaving on the inner wall of the form 15 a deposit 29 of the insoluble constituents from the latex, the supply of latex being kept up from the tank 23. The tank 23 not only acts as an overflow receptacle when filling the tube 15, but by noting the drop in the liquid level in the tank through the sight glass 24 it can be readily determined when enough latex has been used to give the desired thickness of deposit on the form 15. While the tank 23 is one means for obtaining the desired differential pressure between opposite sides of the form during operation, it is obvious that the tank 23 may be omitted or the valves 20 or 45 closed and the differential pressure obtained by merely continuing the pressure on the main latex supply in tank 1, as when originally filling the form, or any equivalent means for maintaining a pressure differential may be used. The process is continued until the desired thickness of deposit has been obtained on the inner wall of the form 15, and it will be seen that due to the tapered form of the plugs 13 and 17 the deposit will be gradually reduced in thickness adjacent the ends of the form. Any other suitable means for forming skived ends on the deposit may be used. The tubular form 15 is then drained, the valves 12 and 20 closed, the couplings 10 and 21 are disconnected, and the tubular form 15 with attached parts removed for drying and vulcanizing of the deposit 29 on the inner wall of the form. When vulcanization has proceeded sufficiently far to completely set the deposit 29 the latter is then stripped from the form 15 and given a further drying and vulcanization if necessary. Stripping may be aided by preliminarily coating the form with starch or other adhesion preventative. During the drying the tube 15 has a tendency to shrink and to collapse, but allowance may be made for the shrinkage and by drying under heat and maintaining the valves 12 and 20 closed the air within the tube 15 becomes heated and expands and some steam is generated from the moisture by the drying heat, with the result that sufficient pressure is maintained within the tubular deposit 29 to prevent collapsing. Or, prior to heating, or during heating, air under slight pressure may be introduced to prevent collapsing and undue shrinkage. In the case of the manufacture of ordinary tubing which does not require the skived ends, instead of following out the above procedure allowance may be made for the shrinkage and the tube dried without using internal pressure. Or instead of disconnecting the form 15 the valve 20 may be closed and steam or other heated medium introduced through the pipe 9 to maintain pressure within the form during the drying operation. If a vulcanized latex has been used the only necessary steps after depositing are drying and stripping the deposit from the form. If an unvulcanized latex has been used this may be compounded in such manner that vulcanization may be accomplished either by the ordinary heat cure or by vulcanization at lower temperatures. In the commercial application of the method it is of course obvious that a large number of forms will be operated upon at the same time.

When making inner tubes in either the straight form or incomplete annular form the skived ends of the tubes, after the latter have been dried and vulcanized, may be joined by any of the usually applied methods, such as heat curing cement, low temperature curing cements, or the sulphur chloride cure.

In Figure 2 there is shown one form of apparatus for applying the method in making tubes, such as inner tubes for tires, in the form of an incomplete annulus. In using this apparatus a form of water permeable material is made up in an incomplete annular shape, a suitable material for making the form being underwriter's fire hose fabric. The form may be made in its curved shape by weaving or it may be made up of strips of fabric sewed together. Into one end of the form 30 a plug 31 is inserted, this plug being tapered at its inner end as shown at 32. Secured in the plug and communicating with the interior of the form is a pipe 33 provided with a valve 34, this pipe being connected by the quick detachable coupling 35 with a latex supply pipe 36. Also connected into the pipe 33 is a drain pipe 37 provided with a valve 38. Also communicating with the interior of the form through the plug 31 is a vent pipe 39 provided with a valve 40. The plug 31 may be secured in the end of the form by a clamp 41. Inserted in the other end of the form is a plug 42 similar in all respects to the plug 31 and secured in place by a clamp 43. Communicating with the interior of the form through this plug is a riser pipe 44 provided with a valve 45, said pipe being adapted to be connected to a pipe 46 by the quick detachable coupling 47. The pipe 46 leads into a tank 48 provided with a sight gauge 48' and below the tank the pipe is provided with a valve 49. Connected to the pipe 44 below valve 45 is a branch 50 controlled by a valve 51, said branch being connected by the quick detachable coupling 52 to an air pipe 53. In carrying out the method the form 30 may be disposed on a table or other support with the ends containing the plugs 31 and 42 slightly elevated, and latex supplied to the form through the pipe 36. This latex is preferably one which has been treated to increase its filtrability or rate of deposit on a water permeable material. As the latex is supplied to the interior of the form the air contained therein is driven out through the interstices of the form and also through the pipe 39. As soon as the latex rises to the top of the pipe 39 the valve 40 is closed and the supply of latex continued until it has risen to a desired height in the tank 48 when the supply from pipe 36 is shut off. The water and water soluble constituents then permeate the form 30, leaving on the inner wall of the form a deposit 54 of the insoluble constituents. As the level of the latex in the form tends to lower the supply is kept up from the tank 48, and by using the sight gauge 48′ it may be determined when the desired thickness of deposit on the interior of the form has been reached. When the desired deposit has been attained the flow of latex is cut off from the tank 48 and the two free ends of the form lowered to a point slightly below the balance of the form. The valves 51 and 38 are then opened and air under a very low pressure, for instance one-half pound, is supplied through the pipe 53, while the unused latex in the form flows out through pipe 37. After the form has been emptied the valves 51 and 38 are again closed and the couplings 35, 47, and 52 are broken, when the form and its plugs can be removed to another location for drying and curing. As pointed out in the previous example the form may be coated with starch or other material which will assist in stripping the dried tube from the form. One way to permit easy separation of the form and the deposited tube in either of the forms shown in Figures 1 or 2 is to provide a continuous seam around the form sewed with a chain stitch, and after the drying operation this chain stitch may be readily ripped open and the form removed from the deposited tube. As in the previous example the latex used may be either a vulcanized one, in which case the deposit need only be dried, or it may be a latex suitably compounded for curing by either the usual heat cure or at lower temperatures.

In Figures 3 to 5 there is shown one form of apparatus which may be used in applying the method to the making of an inner tube in the form of a complete or jointless annulus. In applying the method in this manner an endless form 55 of any suitable permeable material is provided, that shown in the drawings being made with inner and outer fabric layers 56 and 57 having an interposed filler 58 of fibrous material. This filler may be gradually reduced in thickness from the outer to the inner periphery of the form and at its inner periphery the fabric layers are extended radially inwardly to form flaps 59 (Figure 5). Over these flaps suitable washers or rings 60 of felt or other material are disposed and the flaps and felt rings are secured together by rings 61 of metal or other suitable material secured together by means such as the bolts 62. Inserted through the form, preferably on its inner periphery, is a tube 63 provided with an exterior longitudinal groove or channel 64 extending within and without the form, and rotatably disposed on the tube is a sleeve 65 having aligned openings 66 and 67 adjacent its ends, which openings are adapted to be brought in registry with the channel 64 for a purpose to be later described. The inner end of the tube 63 is spaced from the inner wall of the form 55 a distance slightly greater than the thickness of deposit desired. The sleeve is also provided with a flanged thumb piece 68 by means of which it may be conveniently turned. At its outer end the tube 63 is connected to a pipe 69 leading into a T 70, which T is connected to a pipe 71 provided with a valve 72, and the pipe 71 is connected by a quick detachable coupling 73 with a latex supply pipe 74. Also connected to the T 70 is a pipe 75 provided with a valve 76, which pipe is connected by the quick detachable coupling 77 with a supply pipe 78 for air or other suitable medium.

In the operation of this apparatus the form may be vertically disposed as shown in Figure 4 and latex supplied to its interior from the pipe 74. As the latex enters the form the air therein escapes through the interstices of the form and if desired its escape may be assisted by inserting in the top of the outer periphery a hypodermic needle 80. The water and water soluble constituents of the latex then permeate the form 55, leaving on the interior wall of the form a deposit 79 of the solid or insoluble constituents of the latex, the supply of latex being kept up from the pipe 74. After the desired thickness of deposit has been obtained the supply of latex is shut off, coupling 73 disconnected and the position of the form and deposited tube is reversed, that is the part of the form containing the tube 63 is brought to the top with the end of the tube 63 pointing upwardly. A small charge of compressed air under light pressure may then be introduced. The form is then again brought to the position shown in Figure 4 when the small charge of air with the assistance of gravity will force out the unused latex through the tube 63 and pipes 69 and 71. After the form has been emptied the valve 72 is closed, the sleeve 65 rotated to bring its openings 66 and 67 in registry with the channel 64 and heated air or other drying medium is supplied through the pipe 78, this air entering the form through the tube 63 and being exhausted therefrom by way of the channel 64. Instead of removing unused latex in this manner the form may be kept in the position shown in Figure 4 and air introduced at the top through the hypodermic needle 80. After completion of this operation the needle is removed and the freshly laid down deposit 79 immediately closes the opening formed by the needle. As in the preceding cases a vulcanized latex may be used, in which case it is only necessary to dry the deposit 79, or the latex may be suitably compounded for curing by the usual heat cure or at lower temperatures. After the tube formed by the deposit 79 has been dried and cured it may be removed from the form, and it will be seen that the clamping arrangement formed by the parts 60, 61, and 62 allows the form 55 to be readily stripped from the tube 79, particularly if the interior of the form has been preliminarily treated with starch or other adhesion preventative. It will be seen that by the use of our method as above described an inner tube may be made without any joint and which is of uniform thickness throughout. When making inner tubes by the use of our process the so-called valve patch or valve stem reinforcement of fabric may be incorporated in any suitable manner, for instance during the formation of the tube or by external application at a later stage. For example, the patch may be applied to the interior of the form or mold, as by sewing, allowing the deposit to take place as herein described, and then removing the sewing thread prior to drying. The patch may later be coated with cement, latex, and/or sheet rubber if desired. The fabric plies forming the valve patch may be used without previous treatment or they may be preliminarily impregnated with latex or rubberized in any other suitable manner.

If desired straight tubes or tubing such as herein described may be cut into bands, thus giving a seamless rubber band.

While specific examples of the method have been given and specific apparatus for carrying out the method have been illustrated it is obvious that it is not limited in its application and may be used for forming a wide variety of articles and with the use of various types of apparatus for carrying it out. While in the examples given forms of fibrous material have been illustrated and described, any other suitable permeable material may be used, and a choice of such materials will often depend upon their adaptability for use in making any particular desired article.

Having thus described our invention what we claim and desire to protect by Letters Patent is:

1. The method of making hollow rubber articles which comprises disposing a water dispersion of rubber in contact with a surface of a tubular form of fibrous material, withdrawing fluid from said dispersion through said form to thereby deposit solids from the dispersion in tubular shape on said form, gradually reducing the thickness of the deposit adjacent its ends to form skived ends thereon, drying and removing the deposit, and uniting its skived ends.

2. The method of making hollow rubber articles which comprises disposing a body of latex, treated to increase its filtrability, in contact with a surface of a hollow form of water permeable material while maintaining a differential pressure on opposed surfaces of the form, withdrawing fluid from said latex through said form to thereby deposit solids from the latex on said form, drying while maintaining a differential pressure on the deposit, and removing the article.

3. The method of making hollow rubber articles which comprises disposing a body of latex, treated to increase its filtrability, in contact with the interior of a tubular form of fibrous material, withdrawing fluid from said latex through said form to thereby deposit solids from the latex on said form in tubular shape, drying the deposit, pressure being maintained on the interior of the form during each of said operations, and removing the article.

4. The method of making hollow rubber articles which comprises providing a tubular form of fibrous material, introducing therein latex treated to increase its filtrability, withdrawing fluid from the latex through said form to thereby deposit solids from the latex on the form in tubular shape, gradually limiting the thickness of the deposit adjacent its ends to form skived ends thereon, drying and removing the tubular deposit, and uniting its skived ends.

5. The method of making hollow rubber articles which comprises disposing a body of latex treated to increase its filtrability, in contact with a surface of a hollow form of water permeable material, withdrawing fluid from said latex through said form thereby to deposit solids from the latex on said form while maintaining pressure on the latex at the form, drying and vulcanizing the deposit while under pressure, and removing the article.

6. The method of making inner tubes which comprises disposing an aqueous dispersion of rubber in contact with the surface of a water permeable tubular form, depositing rubber from said dispersion on the form by withdrawal of aqueous matter through the form, drying the deposit, a differential pressure being maintained on opposed surfaces of the form during each of said operations, and removing the deposited tube and joining its ends.

7. The method of making inner tubes which comprises supplying an aqueous dispersion of rubber under pressure to the interior of a water permeable tubular form, whereby aqueous matter is withdrawn through the form and rubber deposited on the inner wall of the form, withdrawing the dispersion when the desired thickness of deposit has been attained and simultaneously maintaining pressure on the interior of the form, drying while maintaining an interior pressure, and removing the deposited tube and joining its ends.

8. The method of making inner tubes which comprises supplying rubber latex under pressure to the interior of a water permeable tubular form, withdrawing aqueous matter from said latex through the form to thereby deposit solids from the latex on the form, drying and vulcanizing the deposit while maintaining pressure within the form, and removing the article.

Signed at New York, New York, this 21st day of May, 1925.

ERNEST HOPKINSON.

Signed at New York, New York, this 15th day of June, 1925.

WILLIS A. GIBBONS.